United States Patent
D'Agostino et al.

(10) Patent No.: US 10,793,349 B2
(45) Date of Patent: Oct. 6, 2020

(54) INTERMODAL STORAGE AND TRANSPORTATION CONTAINER

(71) Applicants: Mark John D'Agostino, Bozeman, MT (US); Scott Joseph D'Agostino, Bozeman, MT (US); Ronald William Gusek, Denver, CO (US); Marc Kevin Fisher, Castle Rock, CO (US)

(72) Inventors: Mark John D'Agostino, Bozeman, MT (US); Scott Joseph D'Agostino, Bozeman, MT (US); Ronald William Gusek, Denver, CO (US); Marc Kevin Fisher, Castle Rock, CO (US)

(73) Assignee: Proppant Express Solutions, LLC, Denver, CO (US)

( * ) Notice: Subject to any disclaimer, the term of this patent is extended or adjusted under 35 U.S.C. 154(b) by 414 days.

(21) Appl. No.: 15/264,328

(22) Filed: Sep. 13, 2016

(65) Prior Publication Data

US 2018/0072491 A1    Mar. 15, 2018

(51) Int. Cl.
| | | |
|---|---|---|
| *B65D 88/30* | (2006.01) | |
| *B65D 88/12* | (2006.01) | |
| *B65D 88/32* | (2006.01) | |
| *B65D 90/58* | (2006.01) | |
| *B65B 1/04* | (2006.01) | |
| *B65B 7/16* | (2006.01) | |
| *B65D 88/02* | (2006.01) | |
| *B65D 90/14* | (2006.01) | |
| *B65D 90/54* | (2006.01) | |
| *B65G 63/00* | (2006.01) | |
| *B65G 65/32* | (2006.01) | |
| *B65G 65/42* | (2006.01) | |

(52) U.S. Cl.
CPC ............... *B65D 88/30* (2013.01); *B65B 1/04* (2013.01); *B65B 7/16* (2013.01); *B65D 88/022* (2013.01); *B65D 88/12* (2013.01); *B65D 88/32* (2013.01); *B65D 90/14* (2013.01); *B65D 90/54* (2013.01); *B65D 90/587* (2013.01); *B65G 63/004* (2013.01); *B65G 65/32* (2013.01); *B65G 65/42* (2013.01)

(58) Field of Classification Search
CPC ......... B65D 88/28; B65D 88/30; B65D 88/56
See application file for complete search history.

(56) References Cited

U.S. PATENT DOCUMENTS

| | | | | |
|---|---|---|---|---|
| 4,662,669 | A * | 5/1987 | Erickson | B01J 8/0015 206/596 |
| 6,835,041 | B1 * | 12/2004 | Albert | B61D 9/02 105/241.2 |
| 9,446,801 | B1 | 9/2016 | Oren | |

(Continued)

*Primary Examiner* — Andrew T Kirsch
(74) *Attorney, Agent, or Firm* — Fennemore Craig, P.C.

(57) ABSTRACT

A container or pod is specially constructed for hauling proppant in support of oilfield hydraulic fracturing operations. Dimensions are provided that comport with common dimensions in use for transportation of intermodal containers, with the containers being sized so as not to require special permitting from a regulatory standpoint when two such containers are loaded on a single trailer. A method of filling the containers is also provided, which include inverting the container to fill from a bottom gate that also serves as the discharge opening when the filled container is rotated back into an upright position.

20 Claims, 12 Drawing Sheets

(56) References Cited

U.S. PATENT DOCUMENTS

| | | | |
|---|---|---|---|
| 2013/0209204 A1* | 8/2013 | Sheesley | B65D 88/30 |
| | | | 414/288 |
| 2014/0286716 A1 | 9/2014 | Cochrum et al. | |
| 2014/0305769 A1 | 10/2014 | Eiden, III et al. | |
| 2015/0086307 A1 | 3/2015 | Stefan | |
| 2015/0368052 A1 | 12/2015 | Sheesley | |
| 2016/0031658 A1* | 2/2016 | Oren | B65G 69/185 |
| | | | 414/411 |

* cited by examiner

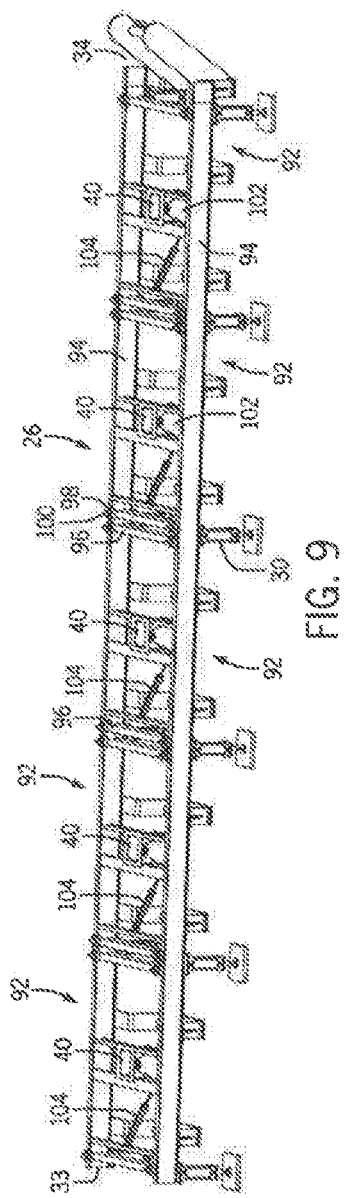
FIG. 9
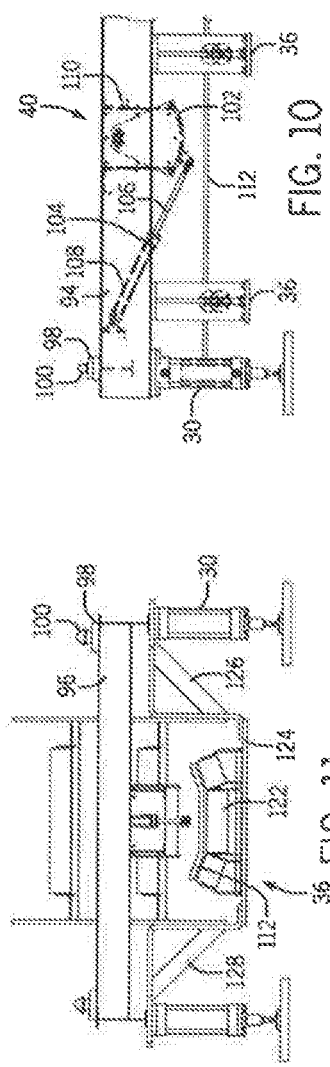
FIG. 10
FIG. 11

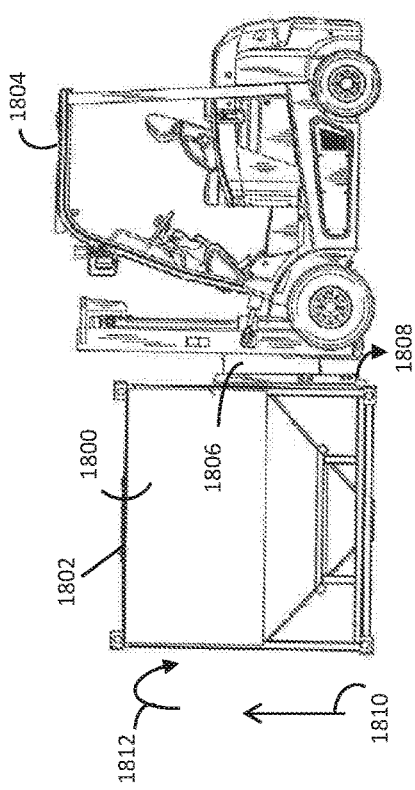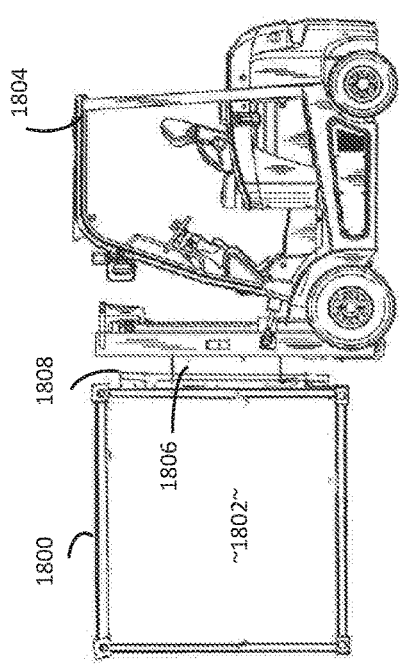
FIG. 18A
FIG. 18B

US 10,793,349 B2

INTERMODAL STORAGE AND TRANSPORTATION CONTAINER

FIELD OF THE INVENTION

The present disclosure generally relates to an intermodal container and base unit having a conveyor for transporting, storing and distributing a frac proppant, such as sand, from a product source to a well site. The intermodal containers and base unit allow a relatively large volume of frac proppant to be stored at a transport terminal or well site and subsequently distributed for use in hydraulic fracturing (herein abbreviated "fracking").

BACKGROUND

At a fracking well site, a granular-containing fluid is pumped through a well bore and to targeted regions to create "fractures" within the underlying hydrocarbon formations. The granular material used in the mining fluid is referred to as a proppant. In many cases, the proppant is a specialized type of sand (natural, man-made or modified), referred to generally as frac sand.

Frac sand must be transported to the well site, which is often a significant distance away from the source of the fracking sand. Presently, the frac sand is trucked to the well site and discharged from the storage truck into a relatively small storage area at the well site. Since large volumes of sand and water must be continuously provided to the well site by trucks, traffic issues arise, which can interrupt the supply of either the water or frac sand. If the supply of either the water or frac sand is disturbed, such a disruption can result in the inefficient use of the well drilling equipment. If well drilling equipment is shut down because of the lack of supply of either sand or water, the cost to the well drilling company can be significant.

SUMMARY

The present disclosure relates to a system and method to provide complete proppant storage, transloading and well pad delivery within unitized intermodal containers. The system and method utilizes an intermodal container that receives a granular material, such as frac sand, from an excavation site. On the intermodal containers are loaded with frac sand, the containers may be transported to a transloading terminal using ships, rail cars or trailer trucks, or a combination of the three. When the intermodal containers are received at the well site loaded with frac sand, the containers are stacked in a storage location on or near the well site. This allows the well site operator to store sand in the same intermodal containers that were used to transport the sand to the well site.

As needed, the intermodal containers are positioned on a base unit and the contents of the intermodal container are emptied onto a conveyor belt supported below a support frame of the base unit. Each of the intermodal containers is designed such that the container can empty the entire contents of the container onto the conveyor belt within approximately five minutes.

Once the container has been emptied of its contents, the container is removed from the base unit and either returned to the storage location or placed on a transportation device, such as a trailer truck, for removal from the well site. The intermodal containers will typically be returned to the proppant source for refilling and retransportation back to the well site. The proppant source could be a mine or other locations that include a supply of the proppant, such as a terminal silo, sea port or other storage location.

The base unit that supports multiple containers allows the containers to be emptied onto a conveyor belt such that the conveyor belt can distribute the frac sand to a blending location. The base unit remains in a fixed position and the series of intermodal containers are placed on the base unit to deliver the frac sand as desired As can be understood by the above description, the same intermodal container is used to receive sand at the sand mine, transport the sand to the well site either on a rail car, ship or truck, store the sand at the well site until the contents of the container are needed and finally discharge the sand onto a conveying system. The use of a single container for initial loading, transportation, storage and discharge reduces the amount of time and transportation cost needed to deliver frac sand to a well site.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 9 is a top perspective view of the base unit;

FIG. 10 is a magnified side view showing the orientation of a clam shell gate;

FIG. 11 is an end view of the base unit;

FIGS. 18A, 18B and 18C show a method of inverting a container in a process of filling the container with proppant through the bottom slide gate when the container is in an inverted position, where the process includes sequential rotation from an upright position (FIG. 18A, to a sideways position (FIG. 18B and the inverted [positon (FIG. 18C);

DETAILED DESCRIPTION

Figure 1:
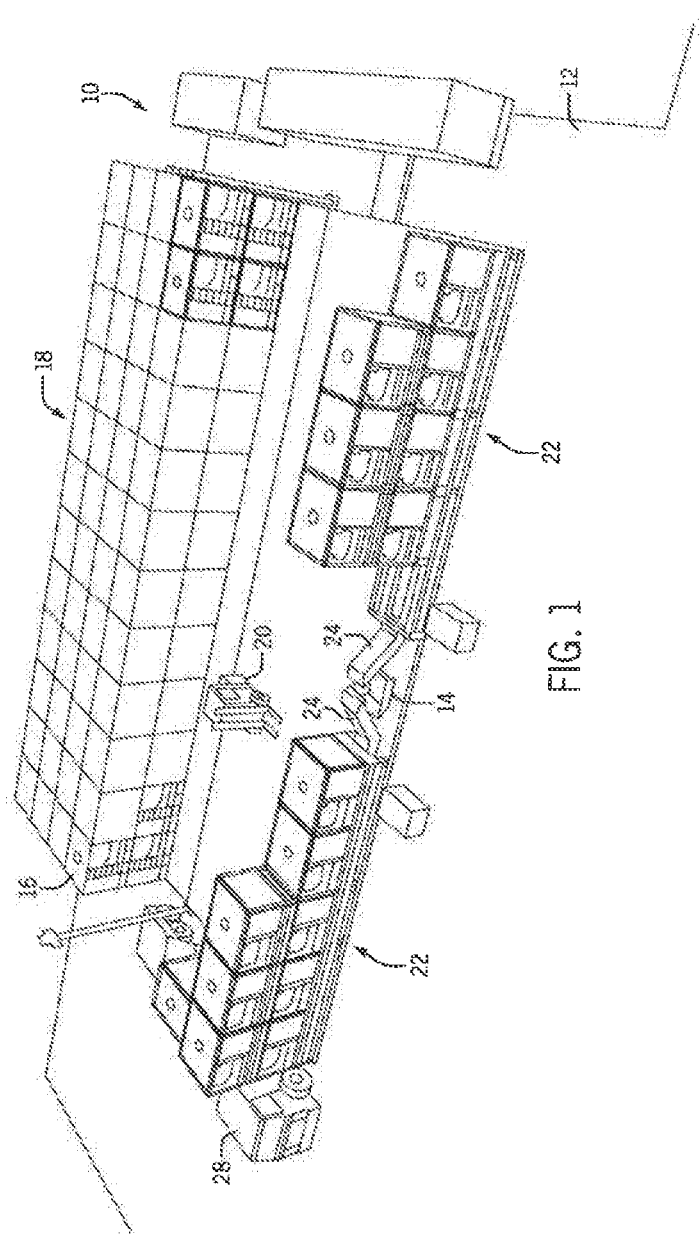
FIG. 1 is a perspective view of a well site including a storage location having a series of stacked intermodal containers and two discharging locations in which the frac sand from the intermodal containers is discharged.

FIG. 1 illustrates a well site 10 that includes a well pad 12. The well pad 12 includes a blender 14 that receives the supply of proppant, such as frac sand, which is then combined with water and distributed through the well bore to carry out the fracking process. Throughout the present disclosure, the term "frac sand" will be used to generally refer to various types of frac proppants, which may include sand, resin coated sand, ceramic sand and yet to be developed proppant materials.

In accordance with the present disclosure, a relatively large number of intermodal containers 16 can be stacked on rig mats in a storage location 18 on the well pad 12. In the embodiment shown in FIG. 1, the storage location 18 includes twelve rows of intermodal containers 16 stacked four deep and two high, which results in 96 individual intermodal containers 16 being contained at the storage location 18. A forklift 20 or other similar device can be used to transport each of the individual intermodal containers 16 from the storage location 18 to one of two discharge locations 22 also on the well pad. Each of the discharge locations 22 feeds a conveyor 24 that receives the frac sand from a base unit 26 to supply the frac sand to the blender 14. In the embodiment shown in FIG. 1, each base unit 26 is located in a fixed position and is sized to support five individual intermodal containers 16 on a first level and possibly another five intermodal containers 16 on a second level. Thus, ten of the intermodal containers 16 can be supported by each of the base units 26.

Once any one of the intermodal containers 16 has been emptied, the forklift 20 removes the container 16 from the base unit and places the empty container either back in the storage location 18 or onto the trailer/transportation truck 28. Although ninety six containers 16 are shown in the storage area 18, it should be understood that the number of storage containers contained in the storage area 18 could be expanded, depending upon the area available at the well site.

Figure 2:
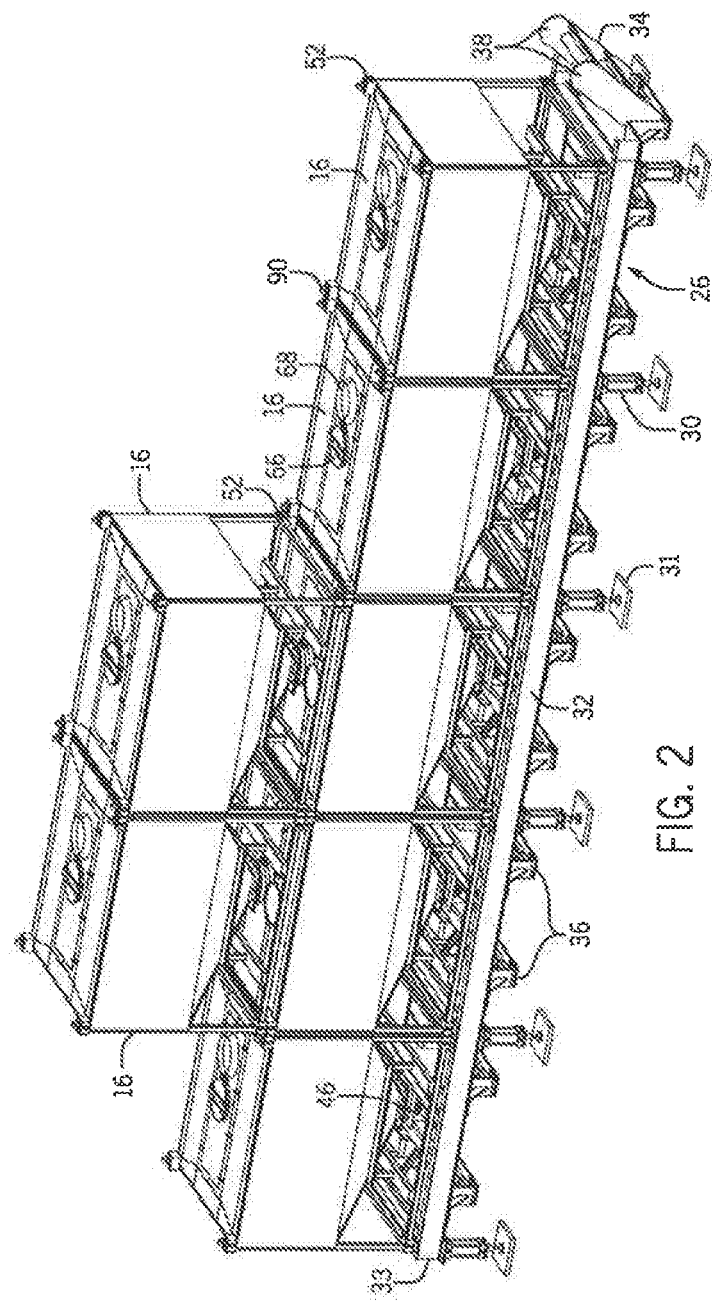
FIG. 2 is a perspective view of two rows of intermodal containers supported on a base unit including a conveyor belt.

FIG. 2 is a perspective view of the base unit 26 with seven individual intermodal containers 16 supported by the base unit 26, five in a first row and two in an upper, second row. The base unit 26 includes a series of stabilizer legs 30 that can be hydraulically adjusted to compensate for uneven ground. Each stabilizer leg 30 includes a base 31 that moves relative to a steel base 32. The base unit 26 supports an upper and lower run of a conveyor belt (not shown) to transport the discharged frac sand along the length of the base unit 26 from a first end 33 to a second, discharge end 34. The base unit 26 includes a series of lower support brackets 36 that support the upper run of the moving conveyor belt that directs the frac sand to the discharge end 34. The discharge end 34 includes a pair of support arms 38 that are angled upward to direct the flow of material to the blender, as illustrated in FIG. 1.

Referring, back to FIG. 2, the base unit 26 is shown in the illustrated embodiment as supporting five individual intermodal containers 16 on a first row and a possible five additional intermodal containers on a second, upper row. When two rows of intermodal containers 16 are stacked as shown in FIG. 2, the upper intermodal containers 16 feed material into the lower intermodal containers. The lower intermodal containers are each aligned with one of five discharge chutes 40 that are selectively controlled to discharge material from the lower intermodal container 16 onto the moving conveyor belt. Further details of the intermodal container 16 and the base unit 26 will be described in detail below.

Figure 3:
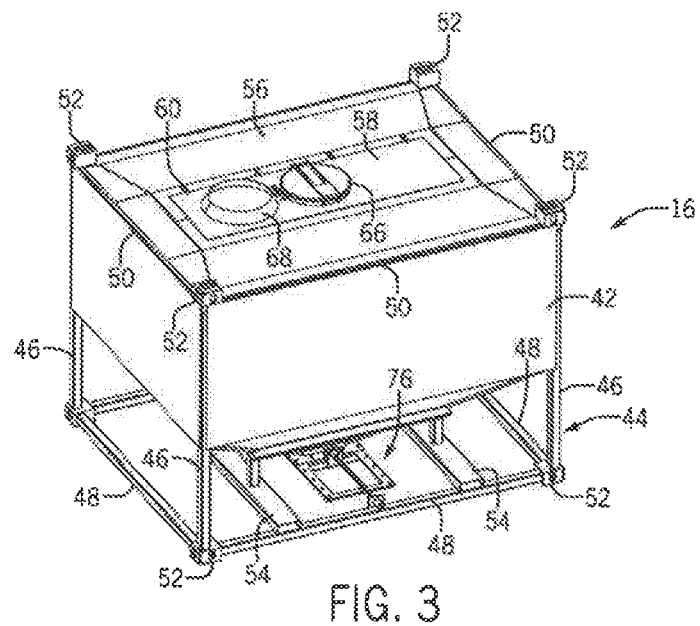
FIG. 3 is a top perspective view of one of the intermodal containers including a closed top hatch.
Figure 4:
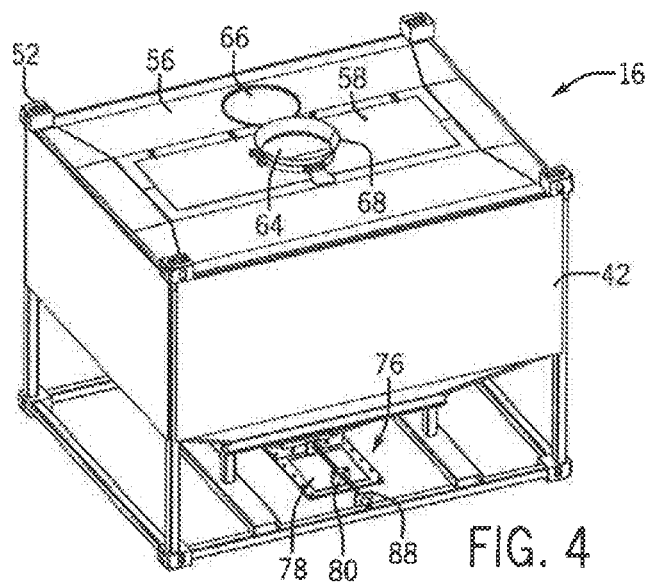
FIG. 4 is a top perspective view similar to FIG. 3 with the top hatch open.

FIGS. 3 and 4 illustrate one configuration for the intermodal container 16. The intermodal container 16 includes a storage body 42 that is formed from eleven gauge steel and supported within a support frame 44. The support frame 44 generally includes four spaced vertical posts 46 that are joined to each other at their bottom ends by a series of lower rails 48. A series of top rails 50 connect the top ends of the posts 46 to provide a stable frame for the storage body 42. As illustrated in FIGS. 3 and 4, each corner of the support frame includes an intermodal corner connector 52, which are standard components and are used to join the intermodal containers to each other and to the base unit 26 when the containers are mounted as shown in FIG. 2.

Referring back to FIGS. 3 and 4, the frame 44 further includes a pair of forklift tubes 54 that are mounted across the front and back lower rails 48. The tubes 54 are sized to receive tines of a forklift such that a forklift can be used to lift and move the entire intermodal container 16.

In the embodiment illustrated, the entire intermodal container 16 has a preferred length of ten feet, a preferred height of eight feet, and a preferred width of eight feet, which is a standard size for intermodal containers used to transport other types of materials. The container has an empty weight of approximately 3500 lbs. and a weight of fifteen tons when fully loaded with frac sand.

While the use of standard intermodal dimensions certainly has a place according to established expectations in the art, definite benefits counterintuitively flow from the use of non-standard dimensions. More can be hauled with less. This is because the various States and the Federal government impose regulatory weight limits upon the trucking industry. If these weight limits are exceeded, it becomes necessary to seek permitting exemptions from these regulations. These exemptions are too frequently accompanied by special requirements, such as a requirement to provide an escort for an oversize load. Practically speaking, the expense and trouble of meeting these special regulatory requirements means that special permitting should be avoided in almost all circumstances. Table 1 below provides a summary of weight limits imposed by various oil-producing States:

TABLE 1

State Weight Limits

| State | Max GVW w/out Permit | Max GVW w/Permit |
|---|---|---|
| Colorado | 80,000 | 97,000 |
| Minnesota | 80,000 | 80,000 |
| Montana | 131,060 | 131,060 |
| North Dakota | 80,000 | 105,500 |

TABLE 1-continued

State Weight Limits

| State | Max GVW w/out Permit | Max GVW w/Permit |
|---|---|---|
| New Mexico | 86,400 | 90,000 |
| Oklahoma | 80,000 | 90,000 |
| Ohio | 80,000 | 120,000 |
| Pennsylvania | 80,000 | 80,000 |
| Texas | 80,000 | 84,000 |
| West Virginia | 80,000 | 84,000 |
| Wisconsin | 80,000 | 80,000 |
| Wyoming | 117,000 | 117,000 |

Because federal regulations also impose weight restrictions, the presumed maximum limit nationwide is 80,000 pounds. Deducting the weight of the tractor and trailer from this maximum limit leaves a payload capacity generally in the range from 48,000 pounds to 54,000 pounds. In the case of intermodal dimensions as discussed above, a 15 ton container weighs 30,000 pounds, which precludes the hauling of two containers on a single trailer without special permitting in all of these States but Montana and Wyoming.

At the same time, the 30,000 pound container weighs from 18,000 pounds to 24,000 pounds less than the presumed maximum permitted payload. Although a single larger container might be built, such a container would be incredibly difficult to move around. Two such containers might be hauled on a single trailer, but only if one or both of these containers is significantly under-filled. Practically speaking, each container would need to be under-filled by approximately 3 tons, or about 20% of the total container weight. This presents a logistical difficulty because the manner of pouring in sand normally precludes pre-measurement of weight and with the sand entering the container is impossible to eyeball the depth of sand. Thus, carefully packing the container with sand would create inordinate delays and expense.

Figure 17:
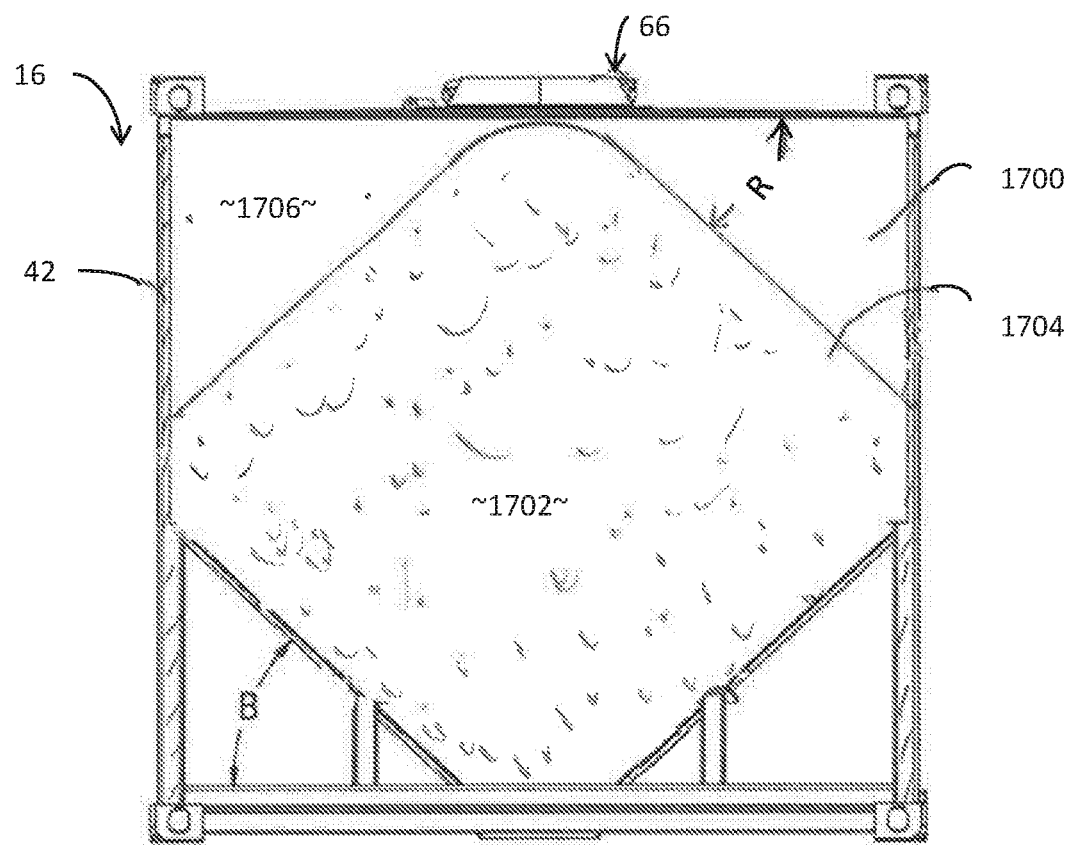
FIG. 17 is a mid-sectional view of the intermodal container providing additional detail with respect to an angle of repose formed by proppant contained within the intermodal container.

Moreover, even partial filling requires guesswork because these containers are not made to be packed completely full. FIG. 17 is a mid-sectional view from which certain structural components have been removed to reveal the contents of an interior cavity 1700 within storage body 42. A quantity of proppant 1702 has been poured into cavity 1700 through top hatch 66. This proppant, of which sand is the most common type, does not completely fill the cavity 1700, although it does rise up to the level of top hatch 66. Dry sand that is poured in this manner forms a natural angle of repose a. The angle of repose is the angle at which slope 1704 s is stable under the influence of gravity. This angle α ranges from about 35° in the case of fine sand to about 42° in the case of coarse sand. It follows that a void in 1706 exists within the cavity 1700, and this is due to the angle of repose.

In the case of a container having dimensions of 8 feet wide, 8 feet long, and 8½ feet tall, this container would contain sand weighing about 40,000 pounds if completely filled. Thus, two such containers would exceed maximum payload limits, considering also the weight of the truck and trailer. Nonetheless, due to the void 1706, these containers weigh substantially less. A container of 8×8×8½ feet contains only about 12 tons of sand once the angle of repose is also considered. Another variance to consider is the density of sand. Sand used as proppant conventionally weighs from 90 lbs/ft$^3$ to 100 lbs/ft$^3$. The dimensions of 8×8×8½ feet encompass an approximate maximum volume that may be utilized in the field taking into account variances in the angle of repose and the density of sand for purposes of hauling sand with two containers filled without exceeding maximum payload limitations.

In some instances, the dimensions of 8×8×8½ feet may cause such containers to exceed maximum payload limits depending upon the weight of the tractor/trailer and the type of sand or other proppant. 'There is a reluctance to reduce one of the 8' with or length dimensions because this may destabilize such a heavy container in transport. Therefore, in practical terms, the height may be reduced to a height of 7½ feet, which accommodates substantially all sand types with the exception of certain ceramic province. Accordingly, the height may be further reduced to a height of 7 feet. The only disadvantage of reducing the height in this manner is the use of non-standard intermodal dimensions that may interfere, for example, with double stack rail transport of the containers in some circumstances, and so the use of non-standard heights is contrary to established expectations in the art. Even so, substantial benefit is obtained by the ability to haul more than one container on a single trailer.

Alternatively, a standard intermodal width of 8 feet may be utilized together with the standard height of 8½ feet. In this instance, the length may shrink to about 7½ feet without unduly stabilizing the container for transport. Thus, in instances where the containers are filled with sand having an angle of repose and the use of intermodal dimensions is an important consideration, the dimensions of about 8'×8'×8½ foot or else dimensions of about 8'×7½' 8½ foot are of critical importance in meeting regulatory weight limit requirements while hauling more than one proppant container.

Figure 5:
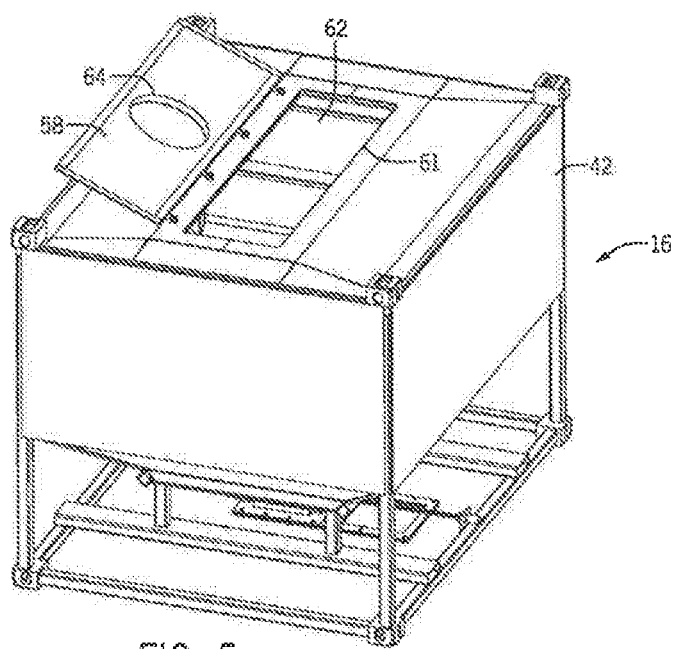
FIG. 5 is a side, top perspective view illustrating the opening of a load door for loading of the intermodal container.

As illustrated in FIGS. 3 and 4, the storage body 42 has a top wall 56 that extends between the series of top rails 50. The top wall 56 includes a load door 58 connected to the top wall by a series of hinges 60. As illustrated in FIG. 5, the load door 58 can pivot to an open position that provides access to a loading opening 61 to the storage body 42. When the load door 58 is in the position shown in FIG. 5, frac sand can be easily loaded into the open interior 62 of the storage body 42. It is contemplated that the load door 58 would be moved to this open position when the container 16 is initially loaded with frac sand.

The load door 58 includes a central opening 64 that allows material to be transferred into the storage body 42 when the load door 58 is in the closed position. The central opening could be used when initially loading the container or when transferring frac sand from an upper container positioned above a lower container. The central opening 64 has a diameter of twenty inches, although other dimensions are contemplated.

Referring back to FIGS. 3 and 4, in the embodiment illustrated, the central opening 64 of the load door 58 can receive either a top hatch 66 or a filler cone 68. When the top hatch 66 is positioned above the central opening 64, the top hatch 66 prevents material from entering into the storage body 42. In the embodiment shown in FIG. 4, the top hatch 66 is mounted to the top surface of the load door 58 by a hinge and can be pivoted to a storage position. The filler cone 68 is also mounted to the top surface of the load door 58 by another hinge and can be pivoted to its usage position in which it is aligned with the central opening 64. The filler cone 68 helps to guide material into the storage body 42, as will be described in greater detail below.

Figure 7:
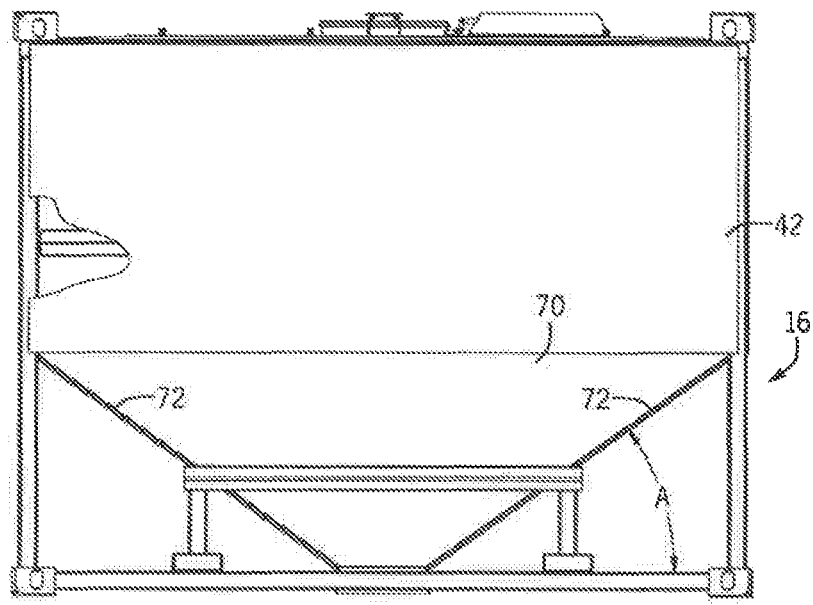
FIG. 7 is a front view of the intermodal container.
Figure 8:
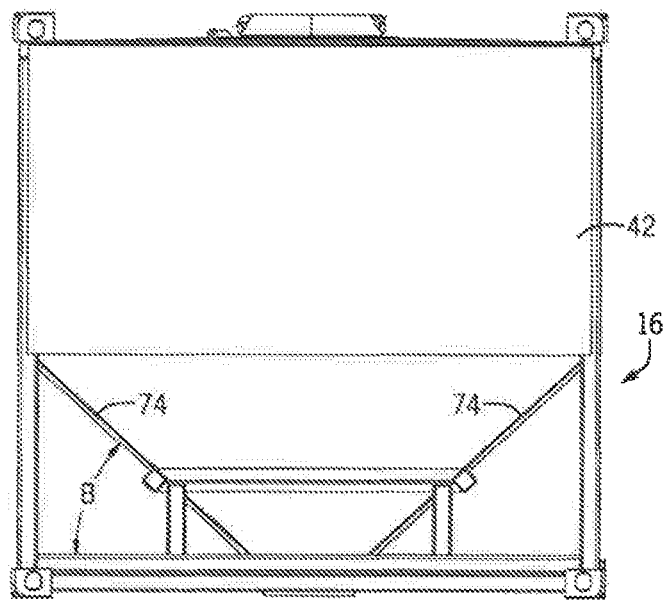
FIG. 8 is a side view of the intermodal container.

Referring now to FIGS. 7 and 8, the storage body 42 of the intermodal container 16 includes a lower discharge portion 70 that is defined by a pair of sloped end walls 72 and a pair of sloped sidewalls 74. The sloped end walls 72 and sloped sidewalls 74 are each formed from steel and meet with each other at a lower end to define a discharge opening for the container 16. The discharge opening allows frac sand to be discharged from the storage body, which is controlled by a manually operated slide gate. In the embodiment shown in FIG. 7, for the case of standard intermodal dimensions, the sloped end walls 72 extend at an angle A of approximately 35° relative to horizontal while the sidewalls 74 shown in FIG. 8 extend at an angle B of approximately 43° relative to horizontal. The angles A and B are chosen to direct the flow of material from within the storage body to the discharge opening through only the force of gravity. The specific angles selected allow the storage body to be emptied of the entire supply of frac sand is less than five minutes. It is preferable that the angles A and B for all walls are at least 35° or greater, in order to assure suitable discharge across a wide spectrum of proppant types.

Figure 6:
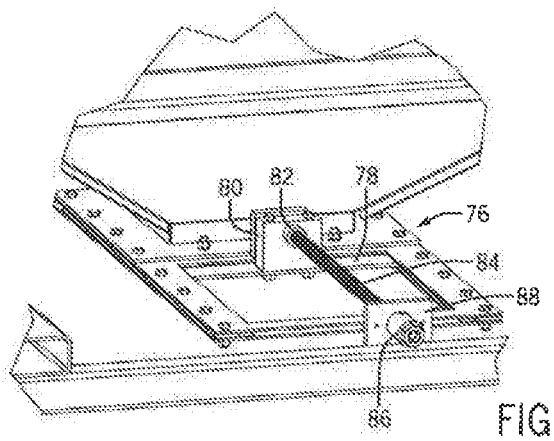
FIG. 6 is a magnified view showing the operation of the manual slide gate for the intermodal container.

Referring now to FIG. 6, the slide gate 76 is shown in its closed position. The slide gate 76 can be manually operated to move a control plate 78 between a fully open position and a fully closed position. The control plate 78 includes a moving mounting block 80 having a threaded receiving opening 82 coupled to an externally threaded control rod 84. The control rod 84 extends through a front support bracket 88 and includes a drive nut 86 that can receive a tool that can be used to manually rotate the control rod 84. As the control rod 84 rotates, the mounting block 80 moves along the length of the threaded control rod. Since the mounting block 80 is connected to the plate 78, rotation of the control rod 84 moves the plate 78 relative to the discharge opening of the intermodal container.

FIG. 3 illustrates the slide gate 76 in the closed position while FIG. 4 illustrates the slide gate 76 in the open position. In the open position, the mounting block 80 has moved toward the support bracket 88 such that the control plate 78 is moved from beneath the discharge opening of the intermodal container 16. In this manner, the slide gate 76 can be used to control the discharge of material from within the storage body 42.

Referring back to FIG. 2, after one of the intermodal containers 16 on the lower row is positioned on the base unit 26, the top hatch 66 is removed and the filler cone 68 moved into position in which it is aligned with the top opening. Once the filler cone 68 is in position, a second intermodal container can be mounted on top of the first intermodal container as illustrated. Prior to such mounting, an intermodal pin 90 is positioned in each of the corner connectors 52. The intermodal pin 90 is then received within a mating corner connector on a second intermodal container mounted to the lower intermodal container.

Once the intermodal container of the top row is positioned on top of an intermodal container of the bottom row, the slide gate for the upper intermodal container is manually opened such that material begins to discharge from the upper container into the lower intermodal container through the top opening of the lower container. If the lower intermodal container is full, the frac sand is prevented from passing from the upper row to the lower row. However, if the lower intermodal container is empty or partially full, sand begins to flow from the upper container to the lower container. In this manner, the material from the upper row of intermodal containers can be discharged into the lower row of intermodal containers for ultimate delivery from the lower container onto the conveyor belt of the base unit 26.

FIG. 9 illustrates a base unit 26 of the present disclosure. As described previously, the base unit 26 supports a conveyor belt that transports the frac sand material from a first end 33 to the discharge end 34. The base unit 26 includes a pair of spaced support rails 94 connected by a series of cross supports 96. Each of the cross supports 96 includes a connector block 98 having an intermodal pin 100. The intermodal pins 100 are received within the intermodal corner connectors (e.g., 71, 73; see FIG. 7) contained on each of the intermodal storage containers mounted to the base unit 26. In the embodiment illustrated, the base unit 26 includes five different mounting locations 92 that each include a discharge chute 40 that are each positioned between a pair of the cross supports 96. The mounting locations 92 each can receive one or more stacked containers 16, as shown in FIG. 2. Referring back to FIG. 9, the discharge chutes 40 each include a gate 102 that is selectively controlled to a user selected position between a fully closed and fully opened position. The discharge chutes 40 can thus be controlled to selectively discharge material from one of the intermodal containers when the intermodal containers are positioned above the discharge chutes, as illustrated in FIG. 2.

As shown in FIG. 9, each of the support rails 94 includes a series of stabilizer legs 30 that each can be independently hydraulically adjusted to level the base unit 26 when the base unit 26 is positioned on uneven ground.

Figure 15:
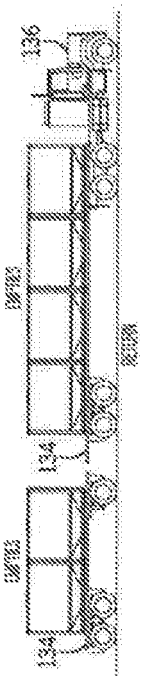
FIG. 15 illustrates the transportation of empty intermodal containers utilizing a truck and trailer.
Figure 19:
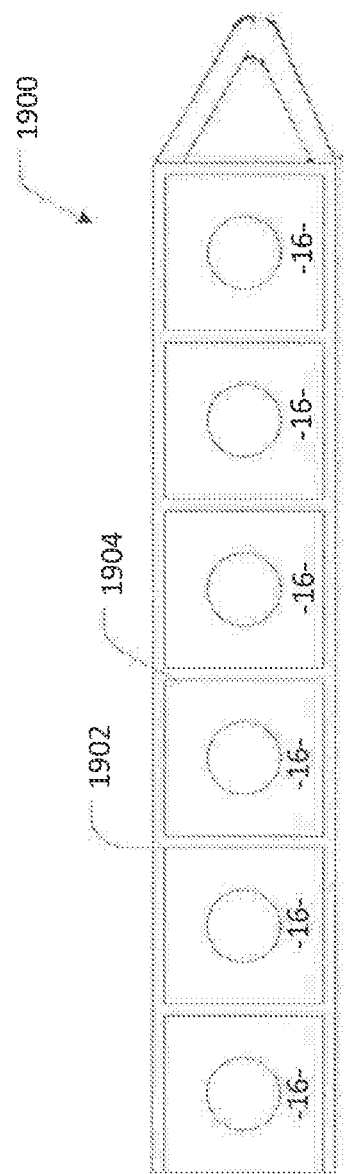
FIG. 19 shows a trailer that has been loaded with a total of six intermodal containers, each in an empty state, along a standard trailer length dimension of 48 feet to present gaps between the respective containers.

With regard to the intermodal pin connectors, it will be appreciated that a rail car (FIG. 12) or tractor-trailer (FIG. 15) may be fitted or retrofitted with intermodal pins and connectors for use in transport operations, even in the case of embodiments where the containers do not have standard intermodal dimensions for small containers. As shown in FIG. 19, a flatbed trailer 1900 has standard length dimension of 48 feet. A plurality of containers 16 are attached to the trailer carrying surface by the use of intermodal pins (not shown). Each of the containers 16 have corners with receptacles for the intermodal pins, as described above. In this case, each of containers 16 have dimensions of 7½ feet in length, 8 feet in width, and eight ½ feet in height. The length dimension of 7½ feet permits a total of six of the containers 16 to reside on the trailer 1900, while providing for gaps, such as gaps 1902, 1904, of approximately ½ foot between the respective containers 16.

Figure 20:
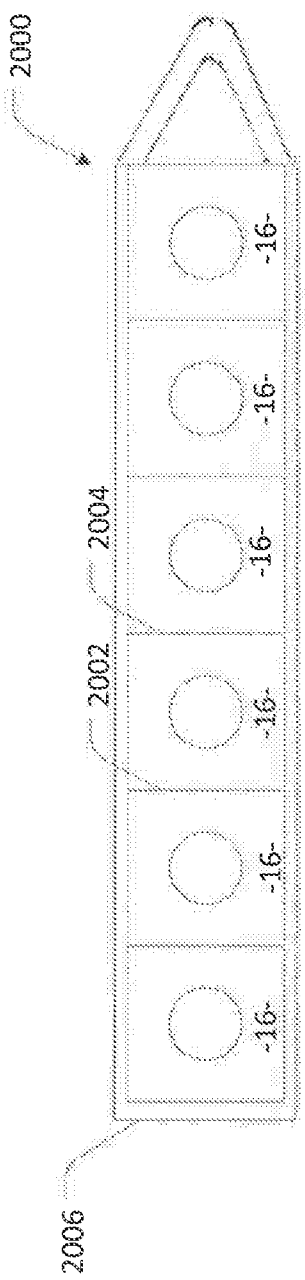
FIG. 20. shows a trailer that has been loaded with a total of six intermodal containers, each in an empty state, along trailer dimension 48 feet to present the containers each immediately adjacent to one another.

FIG. 20 shows an alternative embodiment, namely, that of flatbed trailer 2000. In this case, the trailer 2000 also has a standard length of 48 feet. A total of six containers 16 reside on the trailer 2000 and are retained on the carrying surface of trailer 2000 by the use of intermodal pins. This variety of container 16 has dimensions of 8'×8'×8½'. Thus, the respective containers are substantially immediately adjacent one another, for example, at junctions 2002, 2004. In order to meet regulatory requirements that this cargo must be fully supported by trailer 2000, it is possible to provide gaps between the respective containers, for example at junctions 2002, 2004, by building a supportive extension 2006 at the rear of trailer 2000.

Referring now to FIG. 10, the discharge chute 40 includes a clam shell gate 102 that is connected to an actuator 104. In the embodiment illustrated, the actuator 104 is a hydraulic cylinder having a control rod 106 that is movable into and out of a main body 108. When the control rod 106 is retracted within the body 108, the clam shell gate 102 pivots in a clockwise direction to open the discharge chute 40 and allow material to pass through the chute 110 and fall onto the conveyor belt 112. The conveyor belt 112 is supported by a series of support brackets 36 that each extend beneath the support rail 94. Although the actuator 104 is shown as being a hydraulic cylinder, it is contemplated that the actuator 104 could be an electrical motor or similar component that is operable to move the clam shell gate 102.

When the operator wishes to supply a larger volume of sand onto the conveyor belt 112, the actuator 104 is energized which causes the clam shell gate 102 to move in a clockwise direction and supply additional sand to the conveyor belt 112. If the operator wishes to reduce the amount of material directed onto the conveyor belt 112, the actuator 104 is energized in the opposite direction to extend the control rod 106 and move the clam shell gate 102 in a counterclockwise direction until it reaches the fully closed position shown in FIG. 10.

Figure 16:
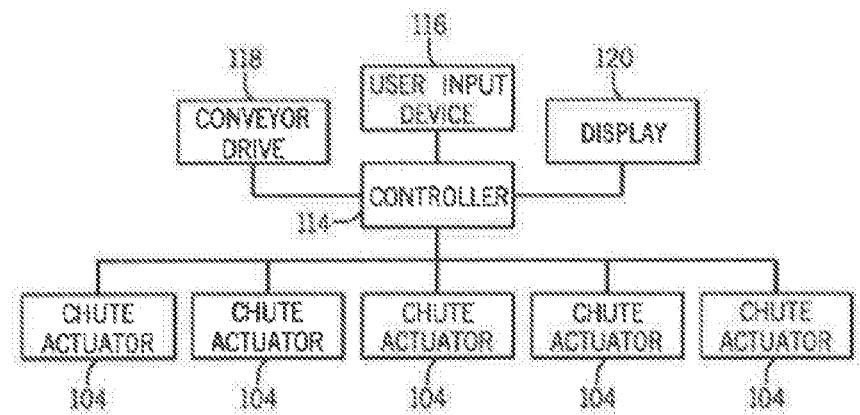
FIG. 16 is a schematic illustration of a control system for the actuators and the base unit.

As illustrated in FIG. 9, each of the discharge chutes 40 includes its own actuator 104 and clam shell gate 102. Each of the actuators 104 can be independently operated and electronically controlled by a central controller 114, as schematically illustrated in FIG. 16. The controller 114 can be mounted at any location at the well site as long as the controller is in communication with each of the actuators 104. In one embodiment, the controller is positioned in a protective housing on the base unit and is in wired communication with the actuators 104 such that the controller 114 can issue command signals to control the movement of the chute actuator in either direction. However, it is contemplated that the controller 114 could also be located remotely from the base unit and be in wireless communication with the chute actuators 104 through conventional wireless communication techniques, such as Bluetooth.

In the embodiment shown in FIG. 16, the actuator 104 is a hydraulic cylinder. It is contemplated that the controller 114 can selectively open and close electronically controlled hydraulic valves to control the flow of hydraulic fluid to the cylinder body of the actuator 104. It is contemplated that the actuator 104 could take other forms, such as an electronically actuated motor or other similar component. In either case, the controller 114 sends control signals that selectively control the movement of the actuator 104 to move the clam shell gate to open and close the discharge chute leading from the intermodal container.

As illustrated in FIG. 16, the controller is coupled to a user input device 116, such as a keyboard, such that the user can enter control commands into the controller 114. It is contemplated that the user input device 116 could take many different forms, such as a keyboard, a mobile device, such as a smartphone or tablet, or any other type of device that can communicate to the controller 114. The communication between the user input device 116 and the controller 114 can be a wired connection or a wireless connection, such as but not limited to Bluetooth. It is contemplated that if the user input device 116 is a mobile device, an operator could control the operating conditions of the base unit 26 from any location within the wireless communication range of the controller 114.

In addition to controlling each of the chute actuators 104, the controller 114 can also control the drive unit or the conveyor belt, as shown by block 118. The controller 114 can also be connected to a display 120 that visually displays the operating parameters for the entire base unit. The display 120 could be located at or near the base unit or could be part of the user input device 116.

Referring now to FIG. 11, each of the support brackets 36 supports a series of rollers 122 that allow the lower run of the conveyor belt 112 to be supported and move along the length of the base unit. The conveyor belt 112 has a width of twenty-four niches in the illustrated embodiment. Each of the rollers 122 is mounted to a lower support plate 124, which in turn is connected to the side brackets 126. A series of braces 128 provide additional strength and stability to support the conveyor belt 112 when the conveyor belt 112 is loaded with material.

Figure 12:
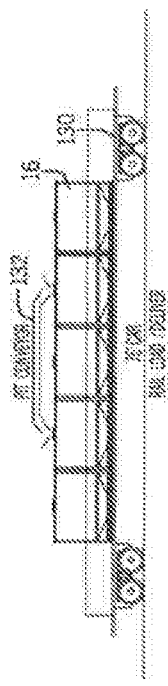
FIG. 12 illustrates the positioning, of multiple containers on a rail car.

FIG. 12 illustrates the use of a rail car 130 to support five separate intermodal containers 16 for initial loading from a pit conveyor 132. The pit conveyor 132 can be located at a sand pit or other location where sand is mined and loaded for distribution.

Figure 13:
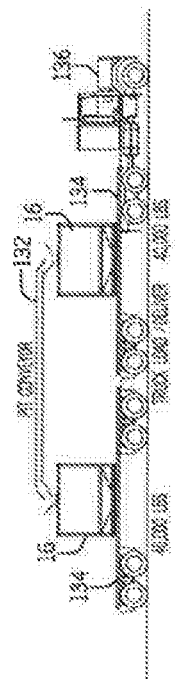
FIG. 13 illustrates the positioning of multiple containers on a trailer.

FIG. 13 illustrates the same intermodal containers 16 mounted on one or more trailers 134 pulled by a cab 136. As in the embodiment shown in FIG. 12, each of the containers 16 can be loaded with sand from a pit conveyor 132 while supported on toe trailer 134.

Figure 14:
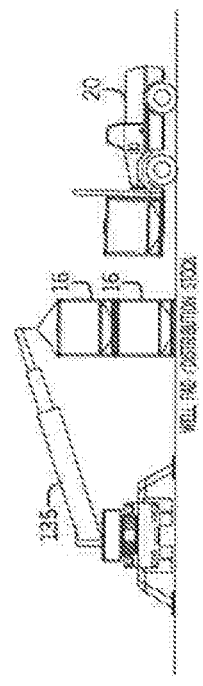
FIG. 14 illustrates the stacking of multiple containers by forklift or similar equipment.

FIG. 14 illustrates the use of a crane 135 that is located at the well site and used to stack the containers 16. Once the containers are empty, the crane and/or the forklift 20 can be used to load the empty containers back on the trailer or rail car. The empty containers can then be returned to the mine or loading facility on the trailers 134 pulled by the cab 136 shown in FIG. 15.

Figure 18C:
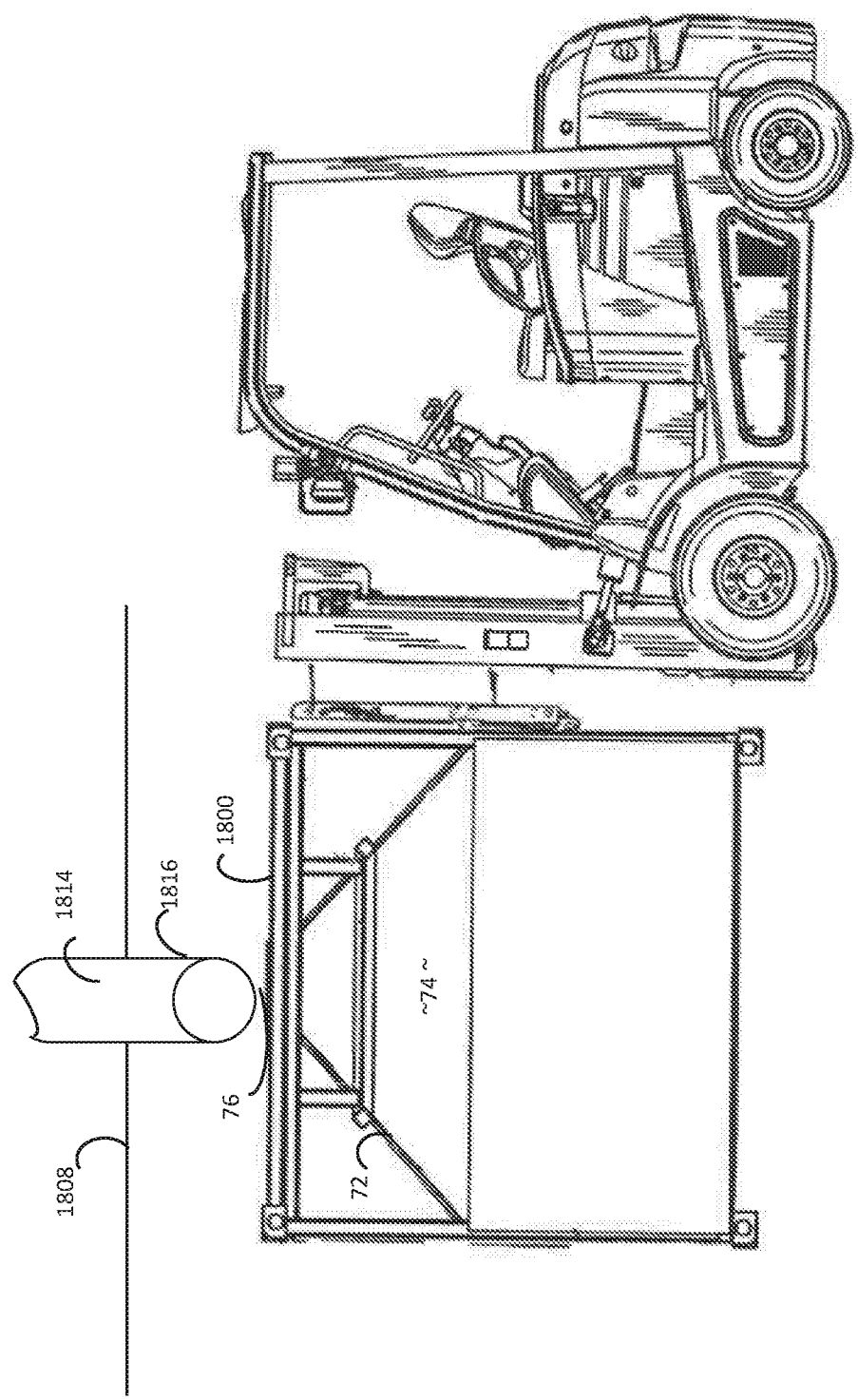

FIGS. 18A, 18b and 18C show an alternative method of filling a container in which the sand does not contain a significant void due to the angle of repose. Container 1800 is identical to container 16 except the container 1800 has no top hatch 66 and, consequently, presents a solid top wall 1802. A forklift 1804 is a special type of forklift with a 360° integral rotator table that may be purchased on commercial order, for example, from Kone Cranes of Markaryd, Sweden.

The rotator table 1806 is capable of rotating fork 1808 of forklift is capable of rotating in a plane. Thus, as shown in FIG. 18A, the forklift 1804 is lifting 1810 the container 1800 and will next spin 1812 the container 1800 perpendicular to the plane of the page. FIG. 18B shows container 1800 at an intermediate position that reveals the solid top wall 1802. As shown in FIG. 18C, the spinning motion if complete, and container 1800 is in an inverted position with slide gate initially open. A discharge chute 1814 is placed with discharge opening 1816 over slide gate 76, as may be operated by a crew member standing on gantry 1818. Proppant discharging through chute 1814 fills container 1800. Filling is substantially complete and uniform because the end walls 72 and sidewalls 74 taper in a manner that approximates the internal angle of repose. Once container 1800 is full, gate 76 is closed and the container 1800 is rotated to an upright position.

It will be appreciated that container 1800 may of reduced size because the manner of filling substantially eliminates the void caused by the internal angle of repose. A container having dimensions of 8 feet in length and 8 feet in width will, generally speaking, meet regulatory weight limits permitting two such containers to be hauled on a civil trailer if the height of such containers ranges from 5½ feet to 6½ feet with the most preferred dimension being about 6 feet.

As most clearly understood in FIG. 1, the transportation, stacking, and unloading of the individual intermodal containers 16 allows a well site operator to store a large volume of sand at a well site. Once each of the individual containers 16 has been emptied, the container can be loaded onto a trailer and hauled back to the mine for reloading with frac sand. Since the intermodal containers 16 can be loaded onto conventional trailers and rail cars, the intermodal containers provide the frac proppant provider with the flexibility of utilizing, the same containers for shipping, storage and distribution of the sand at the well site. The intermodal containers are designed to be stacked in the manner illustrated in FIG. 1, and can be moved around the well site utilizing various different types of equipment, such as forklifts and cranes.

Figure 21:
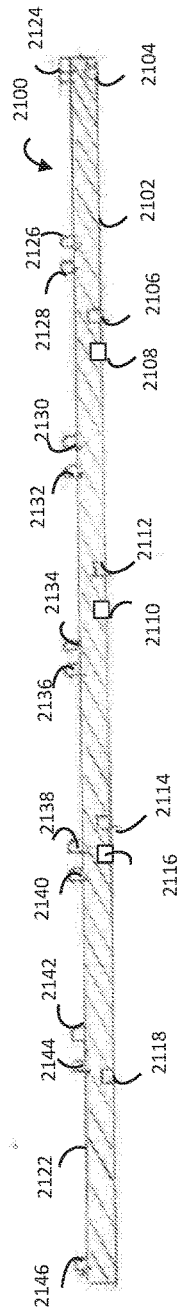
FIG. 21 is a midsection view of an intermodal converter bar.

FIG. 21 is a midsection view of an intermodal converter bar 2100. A lower side 2102 is provided with intermodal pin receivers 2104, 2106, 2108, 2110, 2112, 2114, 2116, 2118. The intermodal pin receivers 2014-2118 are spaced at regular length intervals for intermodal pin-receiver dimensions. By way of example, intermodal containers may have dimensions of 48 feet in length or 40 feet in length. A 'short' container, commonly known as a 20 foot container, has an actual length of 19 feet 10.5 inches. The United States military frequently ships in smaller containers that are a fraction of the length of a 20 foot container, indicating these as bicon (½ length), tricon (⅓ length), or quadcon (¼ length). As used herein, these dimensions are referred to as regular intervals for intermodal pin-receiver dimensions.

Top side 2122 of the intermodal converter bar is provided with intermodal pins 2126, 2128, 2130, 2132, 2134, 2136, 2138, 2140, 2142, 2144, 2146. The intermodal pins 2126-2146 are arranged at irregular length intervals for intermodal pin-receivers. What is meant by 9 regular intervals is a dimension that varies from the regular length intervals described above. These may include, for example, containers that are 8 feet long, 7½ feet long, or 7 feet long.

Figure 22:
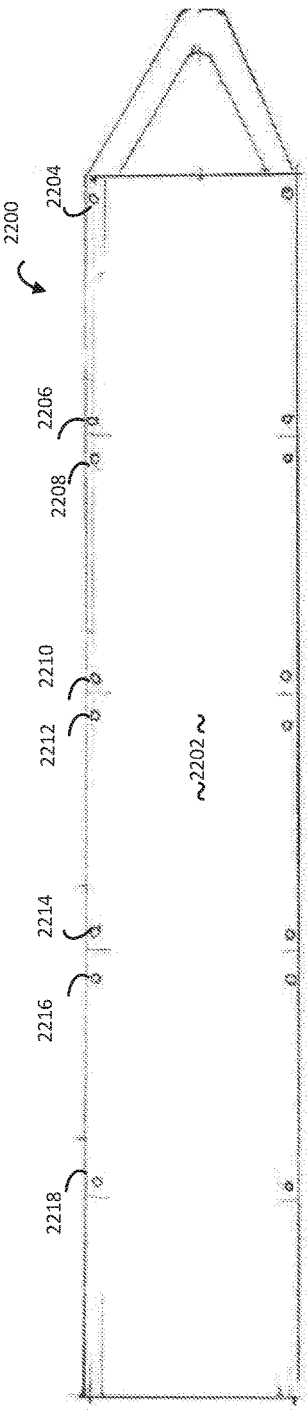
FIG. 22 is a top plan view of a flatbed semi-trailer having intermodal connector; pins rising from the bottom thereof.

FIG. 22 shows a semi-trailer 2200 with a flatbed deck 2202. A plurality of intermodal pins 2204, 2206, 2208, 2210, 2212, 2214, 2216, 2218 protrude upwardly from the deck 2202 at spacing intervals corresponding to receptacles 2104-2118. For engagement therewith. By way of example, as shown in FIGS. 21 and 22, the spacing interval may be that for a bicon container on a flatbed trailer 2200 having a total length dimension of 48 feet.

Figure 23:
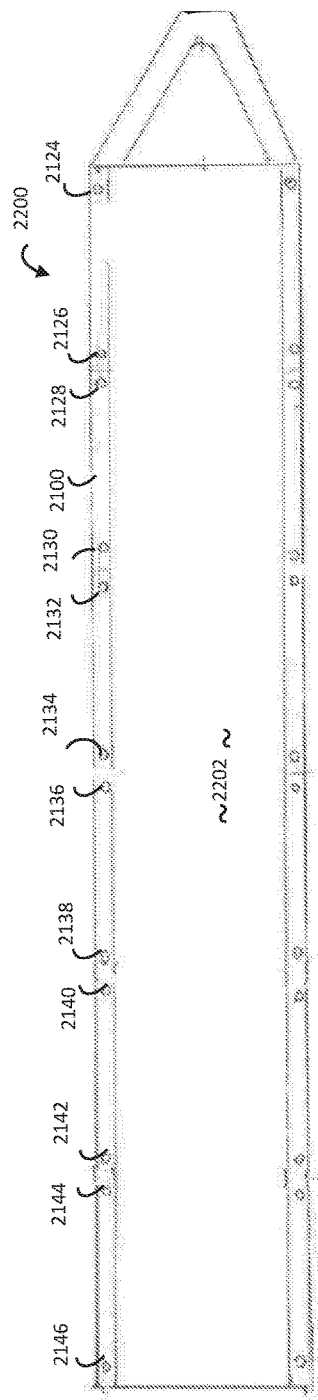
FIG. 23 is a top plan view of the semi-trailer with the intermodal converter bar installed thereon.

FIG. 23 shows the intermodal converter bar installed with pins 2204-2218 engaging receptacles 2104-2118. This presents pins 2124-2146 for use with containers of irregular length.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. In an intermodal container with a fill gate at a top of the container, and rectilinear sidewalls descending from the top towards an inwardly tapered discharge opening, the container being constructed and arranged for the transport of proppant in support of hydraulic fracturing operations, the improvement comprising:
the intermodal container having dimensions of about 8 feet in width, from 7½ feet to 8 feet in length, and from 7½ to 8½ feet in height,
the intermodal container having internal dimensions such that when filled with sand to an internal angle of repose two such containers in combination weigh between 48,000 and 54,000 pounds.

2. The intermodal container of claim 1, wherein the intermodal container has a dimension of about 8 feet in length.

3. The intermodal container of claim 2, wherein the bottom of the container has four corners each provided with receptacles for intermodal pins.

4. The intermodal container of claim 2 wherein the height is 8½ feet.

5. The intermodal container of claim 2 wherein the height is about 8 feet.

6. The intermodal container of claim 2 wherein the height is about 7 feet.

7. A trailer that is retrofitted with intermodal pins for transport of the intermodal container of claim 2.

8. The intermodal container of claim 1, wherein the intermodal container has a dimension of about 7½ feet in length and 8½ feet in height.

9. The intermodal container of claim 8, wherein the bottom of the container has four corners each provided with receptacles for intermodal pins.

10. A trailer that is retrofitted with intermodal pins for transport of the intermodal container of claim 8.

11. In an intermodal container constructed and arranged for the transport of proppant in support of hydraulic fracturing operations, the improvement comprising:
the container having a solid container body that provides a reservoir for containment of proppant,
there being a single opening formed in the container body for both filling the reservoir with proppant and for dispensing proppant from the reservoir,
a gate that is positioned at the opening for selective dispensation of proppant from the reservoir when the gate is in an open position and for retaining proppant within the reservoir when the gate is in a closed position;
and the container having a top that is essentially without an opening for use in filling the reservoir with proppant;
the container having dimensions of about 8 feet in width, 8 feet in length, and a height ranging from 5½ feet to 6½ feet,
the intermodal container having internal dimensions such that when filled with sand two such containers weigh between 48,000 and 54,000 pounds.

12. The intermodal container of claim 11, wherein the height is about 6 feet.

13. A method of filling an intermodal container according to claim 11, the method comprising the steps of:
lifting the container from an upright position by use of a forklift;
turning forks of the forklift to spin the container into and inverted position;
placing the gate in an open position for receipt of proppant into the reservoir;
introducing proppant into the reservoir through the opening while the container is in the inverted position until such time as container is in a substantially filled state;
closing the gate to retain the proppant in the reservoir; and
returning the container to the upright position while the container is in the substantially filled state.

14. A proppant container, comprising:
a container for storage, transportation and dispensation of proppant for use in hydraulic fracturing operations, comprising:
a support frame having dimensions of length, width and height;
a storage body supported by the support frame;
the storage body defining an interior and being constructed and arranged for containment of proppant;
the storage body having a lower discharge portion that tapers inwardly with decreasing height towards a discharge opening at the bottom of the storage body, the discharge opening being the only opening into the interior;

the taper of the storage body being suitably angled for draining proppant from the interior of the storage body through the discharge opening; and a valve mounted proximate the discharge opening, the discharge opening being essentially the only opening in the storage body that is suitable for loading proppant into the storage body;

the container having a size of about 8 feet in length, 8 feet in width, and a height of from 5½ feet to 6½ feet, the intermodal container having internal dimensions such that when filled with sand two such containers weigh between 48,000 and 54,000 pounds.

15. The proppant container of claim 14, wherein the discharge opening is the only opening into the interior.

16. The proppant container of claim 14, wherein the height is about 6 feet.

17. The proppant container of claim 14, wherein the frame is adapted to include a pair of forklift tubes.

18. The proppant container of claim 17, wherein the support frame includes:

a first pair of upright posts each respectively presenting a top and a bottom;

a second pair of upright posts each respectively presenting a top end and a bottom end;

a first cross-member extending between the first pair of upright posts and joined with the first pair of upright posts proximate each respective bottom of the first pair of upright posts; and a second cross-member extending between the second pair of the upright posts and joined with the second pair of upright post proximate each respective bottom end of the second pair of upright posts;

each of the forklift tubes being joined atop the first cross-member and atop the second cross-member so as to bridge between the first cross-member and the second cross-member along one of a width dimension and a length dimension of the container, the forklift tubes each extending substantially in parallel to one another along the dimension that is one of the width dimension and the length dimension.

19. A method of filling a proppant container according to claim 18, comprising:

raising the container by use of a forklift to place the container in a raised state, the forklift being equipped with forks that rotate as a turntable;

simultaneously rotating the forks and container from the raised upright state to invert the container into an inverted state;

opening the valve to provide access to the discharge opening;

introducing proppant into through the discharge opening and into the interior with the container in the inverted state; thereafter closing the valve; and simultaneously rotating the forks and container from the inverted state into the raised upright state.

20. A method of filling a proppant container according to claim 17, comprising:

raising the container by use of a forklift to place the container in a raised state, the forklift being equipped with forks that rotate as a turntable;

simultaneously rotating the forks and container from the raised upright state to invert the container into an inverted state;

opening the valve to provide access to the discharge opening;

introducing proppant into through the discharge opening and into the interior with the container in the inverted state; thereafter closing the valve; and simultaneously rotating the forks and container from the inverted state into the raised upright state.

* * * * *